March 6, 1962 M. S. CURTIS 3,023,631
SINGLE POINT THREAD ATTACHMENT
Filed Dec. 3, 1958 2 Sheets-Sheet 2
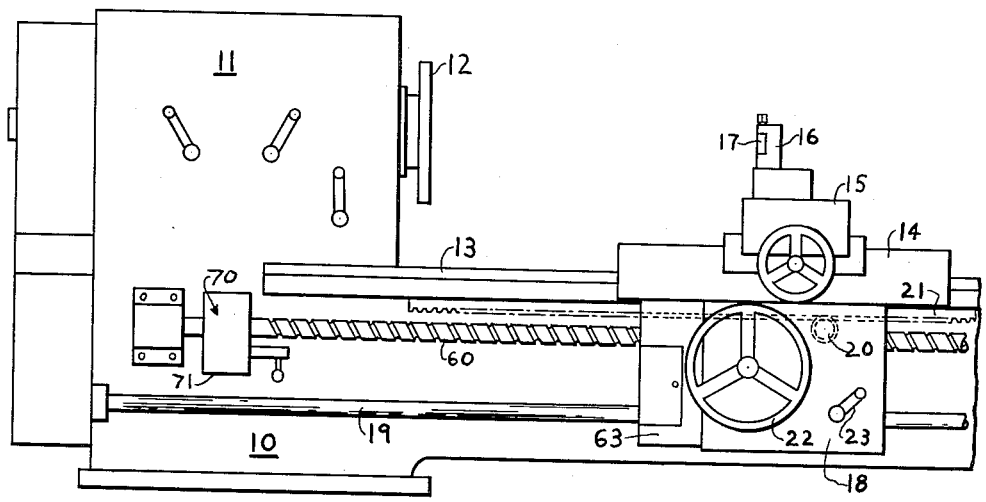
FIG. 4
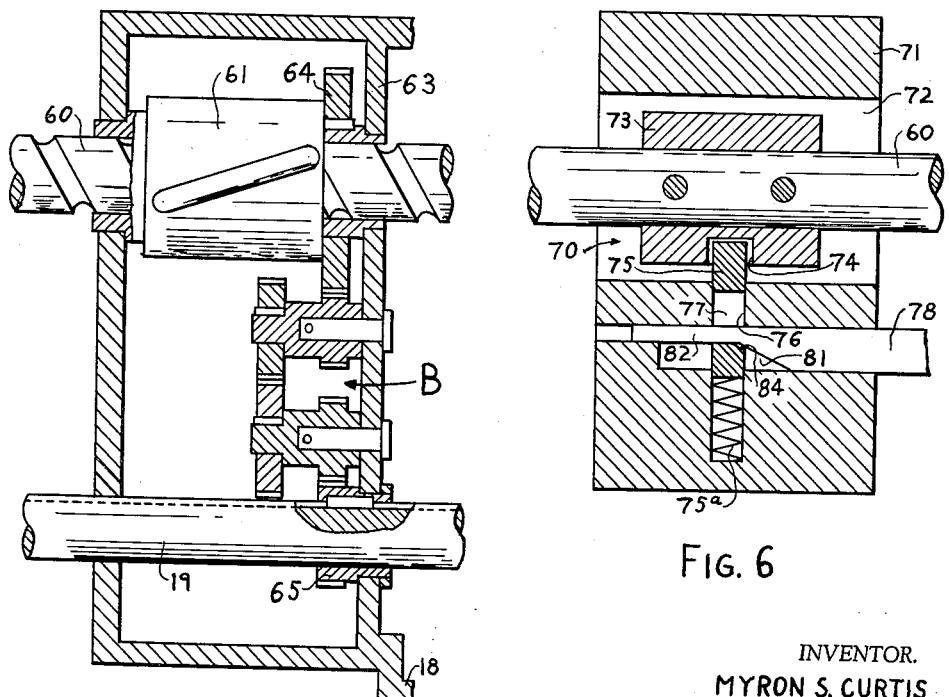
FIG. 5
FIG. 6
INVENTOR.
MYRON S. CURTIS
BY Hudson, Boughton,
Williams, David & Hoffmann
ATTORNEYS March 6, 1962 M. S. CURTIS 3,023,631
SINGLE POINT THREAD ATTACHMENT
Filed Dec. 3, 1958 2 Sheets-Sheet 1

INVENTOR.
MYRON S. CURTIS
BY Hudson, Boughton,
Williams, David & Hoffmann
ATTORNEYS

United States Patent Office 3,023,631
Patented Mar. 6, 1962

3,023,631
SINGLE POINT THREAD ATTACHMENT
Myron S. Curtis, Cleveland, Ohio, assignor to The Warner & Swasey Company, Cleveland, Ohio, a corporation of Ohio
Filed Dec. 3, 1958, Ser. No. 777,991
3 Claims. (Cl. 74—424.8)

The present invention relates to a machine for producing a thread on a workpiece, particularly to a machine tool for cutting a thread with a single point tool.

In a machine tool wherein a workpiece is threaded by feeding a single point tool axially thereof while the workpiece is rotating, the tool and workpiece are relatively moved axially of the workpiece by a relative rotation of a nut and lead screw geared to rotate in a particular relationship to the rotation of the spindle. In a conventional lathe, the nut may be carried by the cross slide carriage and the lead screw rotatably supported by the bed and the lead screw is selectively drivable in timed relation to the spindle through conventional change-speed gearing. For nonthreading operations the carriage is conventionally moved by power means independent of the aforementioned nut and lead screw, and during the threading operation this power means is utilized to return the carriage between successive thread-cutting passes to position the threading tool to start the following pass. The conventional nut which cooperates with the lead screw is commonly what is termed a half or split nut and is disengaged to permit the return movement of the carriage. A problem arises when the nut is to be re-engaged with the lead screw for the next threading cut since the relationship of the thread-forming tool and the workpiece must be the same as on the first cut. If the relative positions of the nut and lead screw are changed for a given position of the carriage, the tool will not follow the thread that it cut on the previous pass. Proper re-engagement is complicated by the fact that the split nut and lead screw must be precisely positioned with respect to each other to effect proper mating or only partial re-engagement of the nut and lead screw might be effected. If this happens, the lead screw and nut are not in their proper relative positions and the tool will not track its previous path on the workpiece.

When it is required to cut threads of high accuracy, the half or split nuts must mesh very precisely with the lead screw with a minimum of looseness and backlash. Such a fit is difficult to maintain because of the tendency for chips and dirt to accumulate on the screw and nut and because of the rapid wear to which the nut is subject. Thus it often becomes necessary to adjust or replace these nuts to maintain the accuracy of the machine. Wear is somewhat decreased by use of a lead screw with a low helix angle, but with such a screw the half nuts require greater care in engagement and are more easily damaged.

An important object of the present invention is to provide, in a machine tool having a slide movable to effect relative feed movement between a rotating workpiece and a single point thread-forming tool, a lead screw and nut for effecting the relative feed movement between the tool and workpiece which will permit the slide to be returned independently of the nut and lead screw without requiring the nut and lead screw to be disengaged from each other and without their exerting a substantial frictional drag by reason of their engagement.

Another object of the present invention is the provision of a new and an improved machine tool having a lead screw drive for moving a slide of a machine tool through a feed movement to effect a relative feed between a thread cutting tool and a rotating workpiece and which is readily effectively disconnected to permit the slide to be returned by another drive and is readily reconnected in a driving relationship with the slide with a minimum of attention by the operator and without the employment of a thread chasing dial for the usual threading-cutting operations.

Further objects and advantages of the present invention will be apparent from the following detailed description of the preferred embodiment thereof made with reference to the accompanying drawings forming a part of this specification and in which:

FIG. 4 is a front elevational view of a lathe embodying the present invention but of a construction different from the lathe shown in FIG. 1;

FIG. 5 is a vertical sectional view through a gear-box on the apron of the carriage of the lathe of FIG. 4 showing the drive to a lead screw used to move the carriage for threading operations; and FIG. 6 is a vertical sectional view through mechanism carried by the bed of the lathe for selectively preventing or permitting rotation of the lead screw for moving the carriage during threading operations.

While the present invention may be embodied in various machines wherein a lead screw and nut are used to move a slide to effect a relative feed movement between a rotating workpiece and a tool to transcribe a helical path on the workpiece and wherein the slide is to be returned after making a pass to a position to initiate another pass on which the tool tracks the helical path of the first pass by means other than the lead screw used to effect the relative feed movement, it is particularly adaptable for use in a lathe for moving a cross slide carriage axially of the spindle to feed a tool supported thereon longitudinally of the work being rotated by the spindle to cut a thread on the workpiece.

Figure 1:
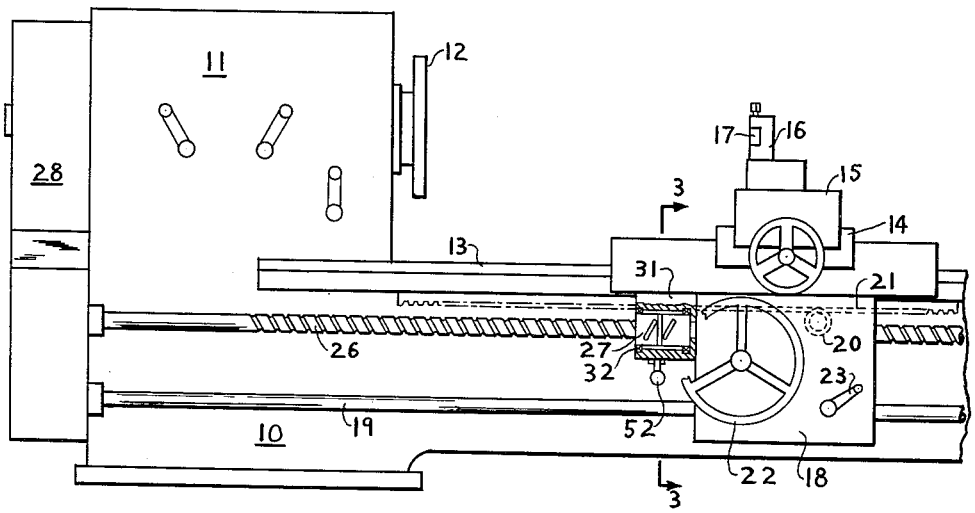
FIG. 1 is a front elevational view of a lathe embodying the present invention, a portion being shown in section.

Referring to FIG. 1, the invention is shown as embodied in a lathe which includes a bed 10 having a headstock 11 at one end thereof in which a spindle 12 is rotatably supported. The bed 10 has ways 13 formed thereon which extend parallel to the axis of the spindle 12 and upon which a cross slide carriage 14 is supported for movement toward and away from the spindle 12. The cross slide carriage 14 supports a cross slide 15 for movement transversely of the axis of spindle 12 and the cross slide 15 is adapted to mount a tool holder 16 for a cutting tool 17 which may be a single point tool used for thread cutting.

The cross slide carriage 14 includes a carriage apron 18 which houses suitable mechanism for providing a power drive from a feed shaft 19 to a pinion gear 20 which meshes with a rack 21 supported by the bed 10 and which is rotatable to move the carriage 14 by power along the ways 13. The driving of the carriage 14 from the feed shaft 19 is controlled by operating a lever 23 on the front of the carriage apron 18. The pinion gear 20 may also be rotated by operating a handwheel 22 to effect movement of the carriage 14.

The feed shaft 19 may be driven in any suitable manner and is conventionally driven in timed relation to the rotation of the spindle 12 through a variable speed drive so that the carriage 14 may be moved along the axis of the spindle 12 at various rates in timed relation to the rotation of the spindle.

The drive for the carriage 14 through the feed shaft 19 conventionally includes a rapid traverse drive for effecting relatively rapid movements of the carriage when a cutting operation is not being performed. The manner of moving the carriage 14 along the bed 10 and the operation of the feed shaft 19 has not been described in detail since it is of conventional construction and does not, per se, form a part of the present invention. Suffice it to say that for cutting operations other than threading, the carriage 14 is actuatable through a feed and return stroke at feed or rapid traverse rates by suitable power means. The particular mechanism for driving the carriage 14 along the ways 13 may be of any conventional construction except as specifically pointed out hereinafter.

Figure 2:
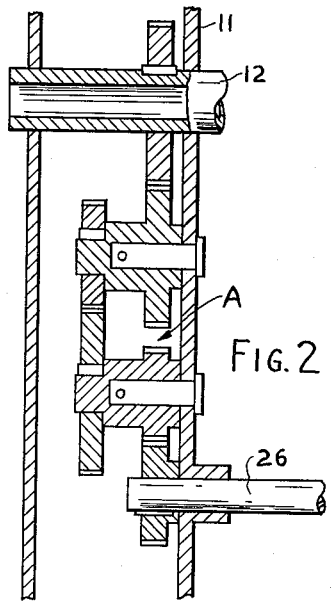
FIG. 2 is a vertical sectional view showing gearing for driving, from the spindle, a lead screw used during threading operations and adapted to drive the carriage of the lathe.

Heretofore, a special lead screw has been provided for moving the carriage 14 through its feed stroke for threading operations. According to the present invention, a ball lead screw 26 and a ball nut 27 are provided and may be selectively employed for effecting the feed movement of the cross slide carriage 14 and, in turn, the tool mounted on the cross slide 15 during a threading operation. The lead screw 26 is rotatably supported by the bed 10 of the machine tool above the feed shaft 19, and the ball lead screw 26 and nut 27 take the place of the conventional threading lead screw and cooperating nut. As is shown in FIG. 1, the ball lead screw 26 extends through the carriage apron 18 and is driven from the spindle 12 by change-speed gearing A housed in a gearbox 28 at the left-hand end of the bed 10 and headstock 11. The change-speed gearing is shown in FIG. 2 and the gears may be changed to selectively rotate the ball screw 26 at various rates in timed relation to the rotation of the spindle 12.

The ball nut 27 which cooperates with the ball lead screw 26 is rotatably mounted on the left-hand side of the carriage apron 18 as the latter is viewed in FIG. 1. The ball nut 27 is rotatably supported by a housing 31 fixed to the left-hand side of the carriage apron and is supported in the housing 31 by suitable bearings 32 which permit the ball nut 27 to rotate within the housing 31 but restrain the nut against axial movement. The ball nut 27 and the lead screw 26 may be of conventional constructions and are readily available from commercial sources. Suitable ball nuts and lead screws are available from Saginaw Steering Gear Division of General Motors Corporation, or Beaver Precision Products, Inc.

While the ball nut 27 is rotatably supported in the housing 31, a detent or locking mechanism is provided for selectively locking the ball nut against rotation to render the ball screw 26 and ball nut 27 effective to feed the carriage upon rotation of the ball screw 26. The locking or detent mechanism comprises a plunger 33 disposed in a bore 34 in the housing 31. The bore 34 extends radially of the nut 27 and the plunger 33 has an inner end 35 adapted to be received in a notch 36 in the ball nut 27. The plunger 33 is slidable to move into and out of the notch 36 and is urged inwardly toward engagement with the notch in the ball nut by a spring 37 disposed in the bore 34 and engaging the end of the plunger remote from the ball nut 27.

The plunger can be retracted against the bias of spring 37 by operating a cam bar 39. The plunger 33 has a central opening 38 therein which is adapted to receive an end portion 40 of the cam bar 39, which bar is slidably disposed in a bore 42 extending transversely of the bore 34 in which the plunger 33 is positioned. The cam bar 39 is disposed below the plunger 33 and its end portion 40 has a cam surface 43 thereon which cooperates with a cam surface 45 formed on the adjacent side wall of the opening 38, which is the side wall remote from the nut 27, to effect the withdrawal of the plunger 33 from the notch 36 when the cam bar 39 is moved inwardly of the bore 42 and into the opening 38 in the plunger 33. The cam bar 39 will effect the withdrawal of the plunger 33 when the bar is moved upwardly and will permit the spring to effect re-engagement of the plunger 33 when the bar 39 is moved downwardly. The cam bar 39 extends outwardly of the bore 42 into a cutout portion 46 in the housing 31 and the outer end of the bar is pivotally connected to an operating lever 47 at a point intermediate the ends of the lever by a pin 48 carried by the lever 47 and received in an elongated opening 50 in the cam bar 39. One end of the operating lever 47 is pivoted at 51 to the housing 31 and the other end has a ball 52 thereon adapted to be gripped by the operator to effect actuation of the lever. The downward movement of the operating lever 47 to withdraw the cam bar 39 is limited by a stop 53 in the cutout portion 46.

The ball nut 27 is only locked against rotation when the carriage 14 is to be fed to effect a thread-cutting pass. After the carriage has moved through a thread-cutting pass, the ball nut 27 is then released for rotation relative to the housing 31 and the carriage 14 returned to a position to begin a second pass by driving the carriage from the feed shaft 19 or by operation of the handwheel 22. By using the normal drive to return the carriage, the carriage may be repositioned for the next pass in a much shorter time than if the lead screw 26 were reversed. Furthermore, the described method of operation makes it unnecessary to provide a mechanism for reversing the direction of rotation of the ball screw 26. During the return of the carriage, the ball nut 27 will rotate relative to the housing 31 but will maintain the same angular relationship with respect to the lead screw 26 for a given position of the carriage and for a given angular position of the spindle 12. Since the plunger can only be re-engaged at a precise point on the nut 27, and since the relative angular positions of the ball screw, ball nut and spindle for a given longitudinal position of the carriage are maintained, as the carriage is returned, the tool is in position to follow the previous thread on the workpiece when the ball nut 27 is in position to be re-engaged by the plunger 33; consequently, the operator need only move the lever 47 to permit the spring 37 to urge the plunger inwardly and then allow ball nut 27 to rotate until the spring presses the plunger 33 into the opening 36.

In the illustrated embodiment, a single notch 36 is provided on the ball nut for receiving the plunger 33. In some applications it may be desirable to provide a plurality of notches, as will be understood by those skilled in the art.

Preferably, the inner end of plunger 33 has tapered sides 54 which engage sides of notch 36 that are correspondingly inclined. The tapered and inclined sides, together with the fact that the plunger 33 is urged inwardly, function to take up any wear that occurs at the end of the plunger to maintain the accuracy of the point of engagement of the plunger. It will be appreciated that normally there must be a clearance space 55 at the inner end of the plunger to accommodate the inward movement thereof upon the occurrence of wear. Similarly, the retracted position of cam bar 39 must provide clearance between the bar and plunger if the plunger is to be able to adjust itself inwardly with wear.

FIGS. 4–6 show a different embodiment of the present invention. The lathe shown in FIG. 4 has a ball lead screw 60, similar to the ball lead screw 26, rotatably supported by the bed 10 and passing through the apron 18 of the carriage 14. A ball nut 61, similar to the ball nut 27 of the first-described embodiment, cooperates with the lead screw 60 and is rotatably carried by the carriage 14. More particularly, the ball nut 61 is supported for rotation but held against axial movement within a change gearbox 63 fixed to the left-hand side of the apron 18 of the carriage 14, as the latter is viewed in FIG. 4. In the embodiment of FIG. 4, the nut 61 is driven from the feed shaft 19 and the ball screw 60 is selectively locked against rotation to effect a drive through the ball screw and ball nut to the carriage 14 from the feed shaft 19. The nut 61 is driven from the feed shaft 19 through change gearing B disposed within the gearbox 63 and adapted to drive a gear 64 fixed to the ball nut 61. The change gearing B is driven from the feed shaft 19 by a gear 65 which is splined to the feed shaft 19 to permit relative axial movement between the feed shaft and the gear as the carriage 14 is moved along the way 13.

Figure 3:
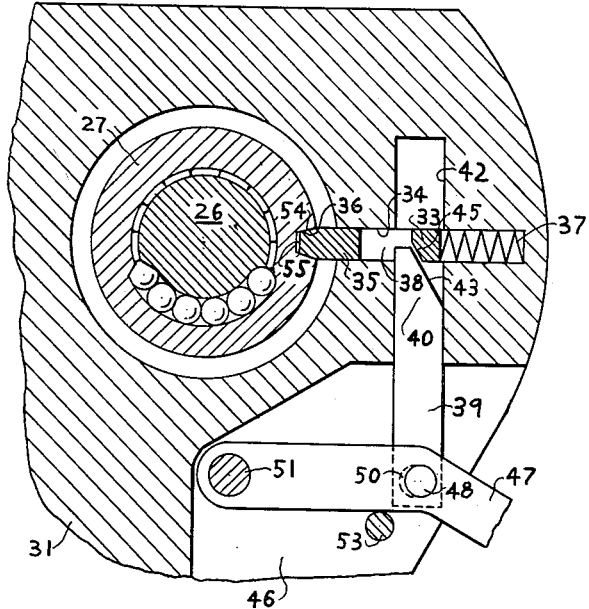
FIG. 3 is a sectional view taken approximately along lines 3—3 of FIG. 1.

The screw 60 is selectively locked against rotation by a detent or locking mechanism 70 adjacent the left-hand end of the lead screw, as it is viewed in FIG. 4. The locking or detent mechanism 70 is disposed within a boss-like housing 71 fixed to the bed of the machine and having an opening 72 through which the lead screw 60 passes. A bushing 73 within the opening 72 is pinned to the lead screw 60 so as to be rotatable therewith. The bushing 73 has a notch 74 therein which is adapted to receive the inner end of a plunger 75 to lock the lead screw 60 against rotation. The plunger 75 is slidably supported in a bore 76 in the boss-like housing 71 so as to be endwise movable in a radial direction toward and away from the bushing 73 and is biased toward engagement with the bushing 73 by a spring 75a disposed within the bore 76 and engaging the end of the plunger 75 remote from the bushing 73. The plunger 75 has an elongated opening 77 therein which is adapted to receive a cam bar 78 for controlling the position of the plunger 75. The boss-like housing 71 has an opening in which the cam bar 78 is slidably supported. The inner end of the cam bar 78 is cut away to provide a cam surface 81 and an inner end portion 82 of smaller width than the remainder of the bar 78. The inner end portion 82 is adapted to extend through the opening 77 in the plunger and when the cam bar 78 is moved inwardly, the cam surface 81 cooperates with an inclined surface 84 formed on the side wall of the opening 77 remote from the bushing 73 to effect a retraction of the plunger 75. Preferably, the outer end of the cam bar 78 extends outwardly of the gearbox 62 into position to be reciprocated by the operator of the lathe. The plunger 75 may have its inner end tapered, as in the first-described embodiment as shown in FIG. 3, to take up for any wear which might occur and to thereby maintain an accurate point of engagement of the plunger with the bushing. Accordingly, the cam bar 78 and the plunger 75 are so designed that initially there is clearance between the cam bar and the side wall of the opening 77 that is engaged by the cam bar, when the plunger 75 is in its engaged position and the cam bar 78 is withdrawn to a point where only the end portion 82 thereof is disposed within the opening 77 in the plunger.

The manner of operation of the lathe shown in FIG. 4 is the same as that shown in FIG. 1 with the exception that the lead screw 60 is arranged to rotate or to be held against rotation to selectively effect a drive through the lead screw and nut to the carriage 14. Since the feed shaft 19 in conventional lathes is intergeared with the spindle, the proper relationship will always be maintained between the carriage, ball screw 60, ball nut 61 and the spindle 12.

From the foregoing, it can be seen that the objects hereinbefore illustrated can be accomplished and that the present invention provides a new and an improved drive for a slide of a machine tool wherein a precision ball lead screw and nut cooperate to drive a slide when the slide is to be moved in one direction and are both allowed to rotate freely with respect to their supporting members when the slide is to bemoved independently of the ball lead screw and nut. Furthermore, a machine has been provided which eliminates many of the problems heretofore present in cutting or forming a thread by moving a cutting or forming tool axially of a rotating workpiece in timed relation to the rotation of the workpiece, particularly where the tool is to be returned and a second pass made. A ball screw and nut is not subject to wear as is the conventional lead screw and nut and since it is not necessary to disengage the nut and lead screw for the return movements of the carriage the use of a ball screw and lead nut minimizes the problem of maintaining the proper relationship between the cooperating lead screw and nut on successive passes of the tool, thereby making it easier to assure that the tool tracks the previous cut during each pass. Furthermore, the pitch of a ball screw and nut can readily be one inch which means that all screws having an even number of threads per inch can be easily cut when such a screw is used without the use of thread-chasing dials.

While preferred embodiments of the present invention have been disclosed in considerable detail, it will be understood that there are further constructions, modifications and arrangements which fall within the ability of those skilled in the art and it is hereby my intention to cover all such constructions, arrangements and modifications that fall within the scope and spirit of the present invention.

Having described my invention, I claim:

1. A drive for a slide of a machine including a pair of cooperating drive members for moving said slide, means forming a drive connection between said members and including thread grooves and balls in said grooves, said drive members constituting a low friction reversible drive wherein when one of said members is locked against rotation and the other of said members is rotated said members move axially relative to each other in one direction, and when the said one of said members is free for rotation it can be moved axially relative to the other of said members in the opposite direction with low friction in response to the application of an axial force to the said one of said members while the members are in engagement regardless of rotation of the other of said members, one of said members being carried by said slide, means for effecting rotation of said one of said members to move the slide in said one direction, means supporting each of said members while in engagement with the other member, locking means actuatable to a first position for preventing rotation of said one of said members in at least one direction only when said one of said members is in a predetermined angular position and actuatable to a second position for permitting rotation of said one of said members, additional means for effecting movement of said slide in said opposite direction, said additional means being operated to move the slide when said one member is unlocked, said members being rotated relative to each other and being in continuous engagement with each other during movement of the slide by operation of said additional means, said locking means comprising a movable plunger supported adjacent said one of said members and an abutment means on said one of said members, said plunger being movable to a position in which it engages said abutment means and prevents rotation of said one of said members when said one of said members is in a predetermined angular position, biasing means engaging said plunger and biasing the latter to its said position, and actuating means for moving the plunger in opposition to said biasing means and for holding the plunger in a retracted position clear of said abutment means.

2. In a drive for a slide of a machine, which slide is to be moved in one direction along a given path in a predetermined relationship to the rotation of the rotatable member, returned in the opposite direction and moved again in said one direction along the path in the same relationship to the rotatable member and so that the positions of the slide along the path and the corresponding angular position of the rotatable member are the same in the second pass as in the first pass in said one direction, a pair of cooperating drive members one of which is carried by said slide and comprising a ball type lead screw and cooperating ball type nut for moving said slide in said one direction, means for effecting rotation of one of said drive members in timed relation to the rotation of said rotatable member, means supporting each of said drive members for rotation while in engagement with the other drive member, means forming a drive connection between said drive members and including thread grooves and balls in said grooves, locking means actuatable to a first position for preventing rotation of the other of said drive members in at least one direction only when it is in a predetermined angular position, said locking means being actuatable to a second position for permitting free rotation of said other of said drive members, and additional means for effecting movement of said slide in the opposite direction from said pass direction and at a faster rate than the rate of movement of the slide in said one pass direction, said additional means being operated to move the slide when both of said drive members are rotatable relative to and in continuous engagement with each other and during movement of the slide by operation of said additional means, said locking means comprising selectively engageable locking elements one of which elements is rotatable with said other of said members and the other of which elements is engageable with the said one locking element to prevent rotation thereof and of said other drive member only when said other member is in a predetermined angular position.

3. A drive as defined in claim 2 wherein said locking means is comprised of a movable plunger supported adjacent said other of said drive members and an abutment means on said other of said drive members, said plunger being movable to a position in which it engages said abutment means and prevents rotation of said other of said drive members when it is in a predetermined angular position, biasing means engaging said plunger and biasing the latter to its said position, and actuating means for moving the plunger in opposition to said biasing means and for holding the plunger in a retracted position clear of said abutment means.

References Cited in the file of this patent

UNITED STATES PATENTS

| | | |
|---|---|---|
| 421,181 | Lobben | Feb. 11, 1890 |
| 523,327 | Conradson | July 24, 1894 |
| 1,749,598 | McNutt | Mar. 4, 1930 |
| 1,875,096 | Miller | Aug. 30, 1932 |
| 2,207,386 | Tampier | July 9, 1940 |
| 2,497,424 | Terdina et al. | Feb. 14, 1950 |
| 2,817,418 | Vial | Dec. 24, 1957 |
| 2,844,969 | Lohr | July 29, 1958 |
| 2,857,776 | Williams et al. | Oct. 28, 1958 |
| 2,958,232 | Benninghoff et al. | Nov. 1, 1960 |